(12) United States Patent
Rao

(10) Patent No.: US 8,180,276 B2
(45) Date of Patent: *May 15, 2012

(54) MOBILE DEVICE THAT PRESENTS INTERACTIVE MEDIA AND PROCESSES USER RESPONSE

(76) Inventor: Bindu Rama Rao, Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/093,733

(22) Filed: Apr. 25, 2011

(65) Prior Publication Data

US 2011/0202383 A1    Aug. 18, 2011

Related U.S. Application Data

(63) Continuation of application No. 11/977,763, filed on Oct. 25, 2007, now Pat. No. 7,983,611.

(51) Int. Cl.
*H04H 1/00* (2006.01)

(52) U.S. Cl. .............. 455/3.04; 455/456.2; 455/566; 455/158.2; 705/7.19; 705/14; 705/79

(58) Field of Classification Search .......... 455/3.04, 455/3.05, 406, 407, 456.2, 557, 411, 415, 455/414.1, 466, 566, 158.2; 705/10, 14, 705/23, 67, 76, 75, 71, 73, 205, 44, 35, 40, 705/42, 27, 64, 7.19; 370/356
See application file for complete search history.

(56) References Cited

U.S. PATENT DOCUMENTS

| | | | | |
|---|---|---|---|---|
| 5,805,821 A * | 9/1998 | Saxena et al. | ................. | 709/231 |
| 7,956,272 B2 * | 6/2011 | Wysocki et al. | ............ | 84/477 R |
| 7,983,611 B2 * | 7/2011 | Rao | .............................. | 455/3.04 |
| 2002/0007303 A1 * | 1/2002 | Brookler et al. | ................ | 705/10 |
| 2006/0029051 A1 * | 2/2006 | Harris et al. | .................. | 370/356 |
| 2006/0034266 A1 * | 2/2006 | Harris et al. | .................. | 370/356 |
| 2007/0038941 A1 * | 2/2007 | Wysocki et al. | ............. | 715/748 |
| 2007/0155411 A1 * | 7/2007 | Morrison | ..................... | 455/466 |
| 2008/0082394 A1 * | 4/2008 | Floyd et al. | ..................... | 705/10 |

* cited by examiner

*Primary Examiner* — Tan Trinh

(74) *Attorney, Agent, or Firm* — McAndrews, Held & Malloy, Ltd.

(57) ABSTRACT

An electronic infrastructure consisting a plurality of client mobile devices, a distribution server and a media creator computer, wherein the client mobile devices present interactive media upon user request. The plurality of client mobile devices support dynamic screen display and, contain a plurality of soft keys. The distribution server that supports delivery of interactive media to the client mobile devices. The media creator is a personal computer that generates interactive media and sends them to the distribution server for distribution. A network such as combination of Internet and mobile network communicatively couple the plurality of client mobile devices, distribution server and personal computer (media creator). The personal computer sends interactive media to the distribution server, the distribution server processes and sends the interactive media to the client mobile device and the client mobile devices presents the interactive media in a series of screens to the user. The client mobile devices interactively send the user responses back to the distribution server.

21 Claims, 10 Drawing Sheets

MOBILE DEVICE THAT PRESENTS INTERACTIVE MEDIA AND PROCESSES USER RESPONSE

CROSS REFERENCES TO RELATED APPLICATIONS

The present patent application is a continuation of, claims priority to, and makes reference to U.S. non-provisional patent, Ser. No. 11/977,763, entitled "MOBILE DEVICE THAT PRESENTS INTERACTIVE MEDIA AND PROCESSES USER RESPONSE", filed on Oct. 25, 2007 now U.S. Pat. No. 7,983,611. The complete subject matter of the above-referenced United States patent application is hereby incorporated herein by reference, in its entirety.

The present patent application makes reference to U.S. non-provisional patent Ser. No. 11/821,771, entitled "SYSTEM FOR PROVIDING INTERACTIVE USER INTEREST SURVEY TO USER OF MOBILE DEVICE", filed on Jun. 25, 2007. The complete subject matter of the above-referenced United States patent application is hereby incorporated herein by reference, in its entirety.

This patent application makes reference to U.S. provisional patent, Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006. The complete subject matter of the above-referenced United States patent application is hereby incorporated herein by reference, in its entirety.

This patent application makes reference to U.S. Provisional Patent Application Ser. No. 60/524,568, entitled "QUESTIONNAIRE NETWORK FOR MOBILE HANDSETS," filed on Nov. 24, 2003. The complete subject matter of the above-referenced United States Provisional patent application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional patent application is hereby incorporated herein by reference, in its entirety.

This patent application makes reference to U.S. patent application Ser. No. 11/977,764 entitled "MEDIA DISTRIBUTION SERVER THAT PRESENTS INTERACTIVE MEDIA TO A MOBILE DEVICE," filed on Oct. 25, 2007. The complete subject matter of the above-referenced United States patent application is hereby incorporated herein by reference, in its entirety.

BACKGROUND

1. Technical Field

The present invention relates generally to mobile content processing; and, more particularly, to display of interactive media by a mobile device.

2. Related Art

Cell (mobile) phones are widely used as mobile devices to communicate anywhere in the world. Some of them are very simple devices capable of voice communication alone. Many other today's mobile devices are used for multiple purposes, other than voice communication, in any convenient location.

They keep record of appointments and schedules, store addresses, present calendars, surf Internet, play games among many other purposes. They are capable of playing music and other audio clips, and also play video clips and movies. They can be networked with external devices such as other mobile phones, laptops and personal computers and modems via infrared, Bluetooth and wifi interfaces. This enormously increases their functionality when compared to just few years ago.

Today's mobile devices have extensive processing ability and capable accomplishing many tasks that were usually meant for personal computer alone. However, battery life is always a concern, with batteries needing to be charged every couple of days. Some modern mobile devices have wide screens with alpha numeric keyboards and many soft (programmable) keys. These devices are programmable and have ability to download programs such as XML (eXtensible Markup Language) files and run them on mobile devices. These programs accomplish many tasks such as managing daily tasks, assisting marketing, keeping data and files stored, managing databases etc. However, today the range of these programs are very limited and they accomplish far less tasks than there is demand among people.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
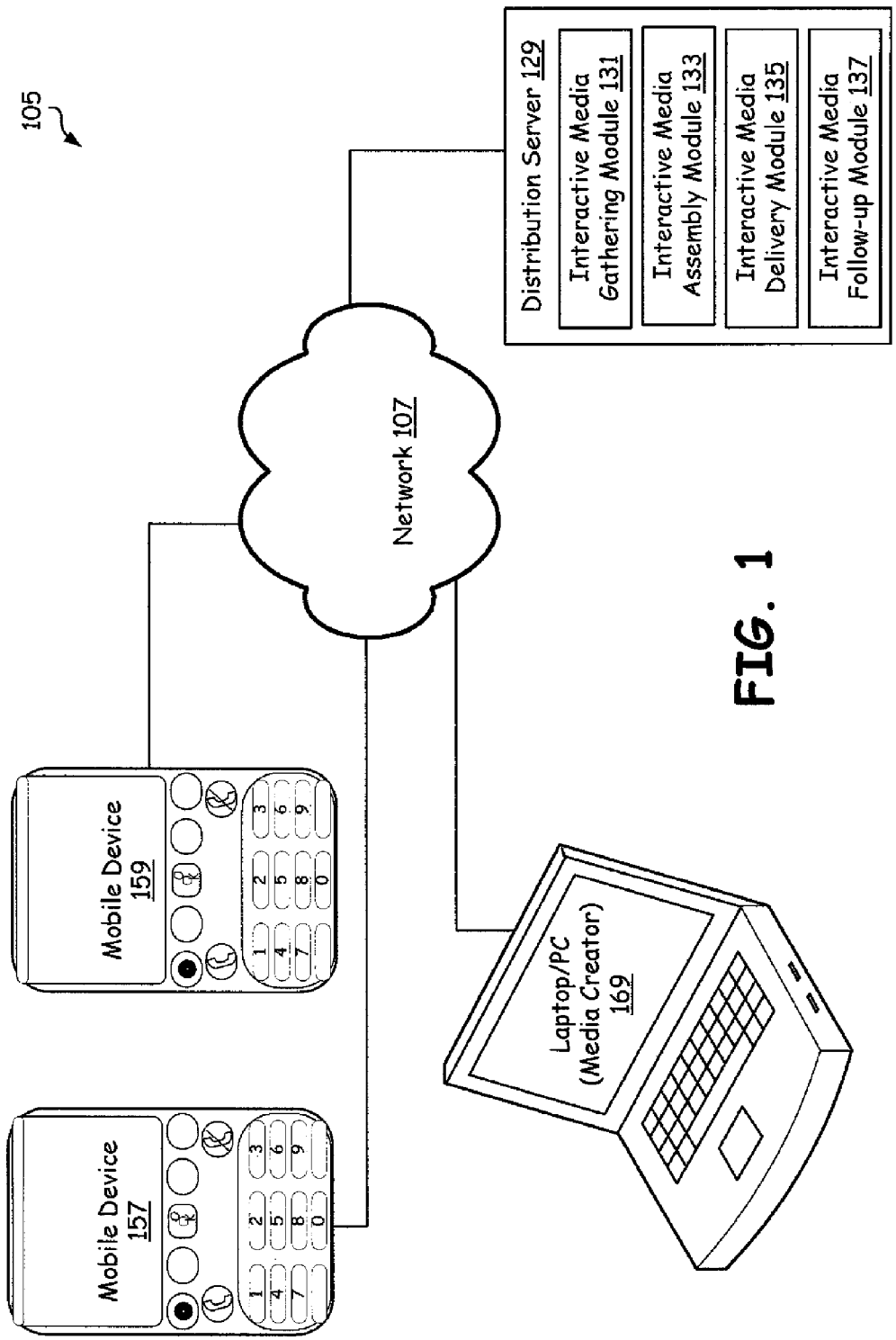
FIG. 1 is a schematic block diagram illustrating an electronic infrastructure containing client mobile devices, media creator personal computer and distribution server, wherein the distribution server distributes interactive media to the client mobile devices and the client mobile devices manage the interactive media.

FIG. 1 is a schematic block diagram illustrating an electronic infrastructure 105 comprising client mobile devices 157, 159, a media creator personal computer 169 and a distribution server 129, wherein the distribution server 129 distributes interactive media to the client mobile devices 157, 159 and the client mobile devices 157, 159 display and manage the interactive media. In particular, the client mobile devices 157, 159 receive an interactive media list from the distribution server and displays one of plurality of interactive media in full length for a user, based upon the user's choice. Then, the client mobile devices 157, 159 process the user responses to multiple choices presented in the interactive media and send them back to the distribution server 129 for further action. For example, the interactive media may contain an XML (eXtensible Markup Language) file to be downloaded to the client mobile devices 157, 159, running them in the client mobile devices 157, 159, processing the user responses to the multiple choices provided and sending them back to the distribution server 129. Soft keys and options provided within the screens allow user to navigate between screens and obtain relevant information, make an appointment with an agent, seller or service provider, request samples of products or services and trial runs of software, among other possibilities. The interactive media are produced by users of the media creator personal computers 169, who logon to the distribution server and upload interactive media after formal procedures of registering and making payments.

Figure 2:
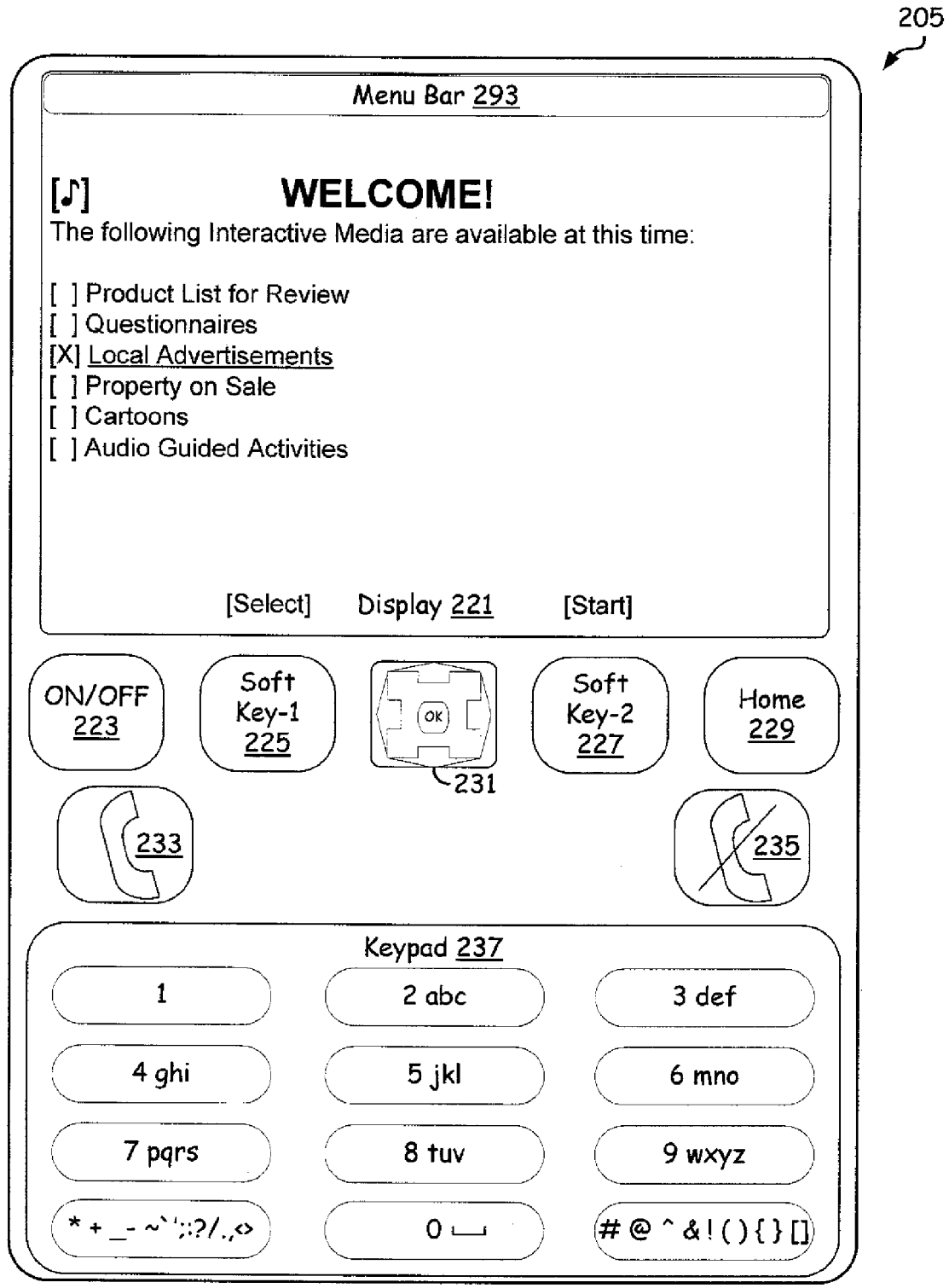
FIG. 2 is an exemplary schematic block diagram illustrating snap shot of a client mobile device displaying a welcome screen.

The display of interactive media begins with a welcome screen (refer to the description of FIG. 2 for more details). The welcome screen may contain a splash message (audio visual message) letting the user know about the services provided by the distribution server 129 and providing a multiple choice selections. These selections allow user to pick one of many categories of interactive media. For example, the welcome screen, with a list of interactive media presented, may contain categories as advertisements, questionnaires, product lists for review, real estate list for properties on sale, cartoons, audio guided activities, etc. The user is prompted by soft keys (or buttons) to Select or Create. Instead of a multiple choice selections, a list of available interactive media is also selectively provided to allow a user to select from, rather than prompting selection starting with a set of selectable categories.

Figure 3:
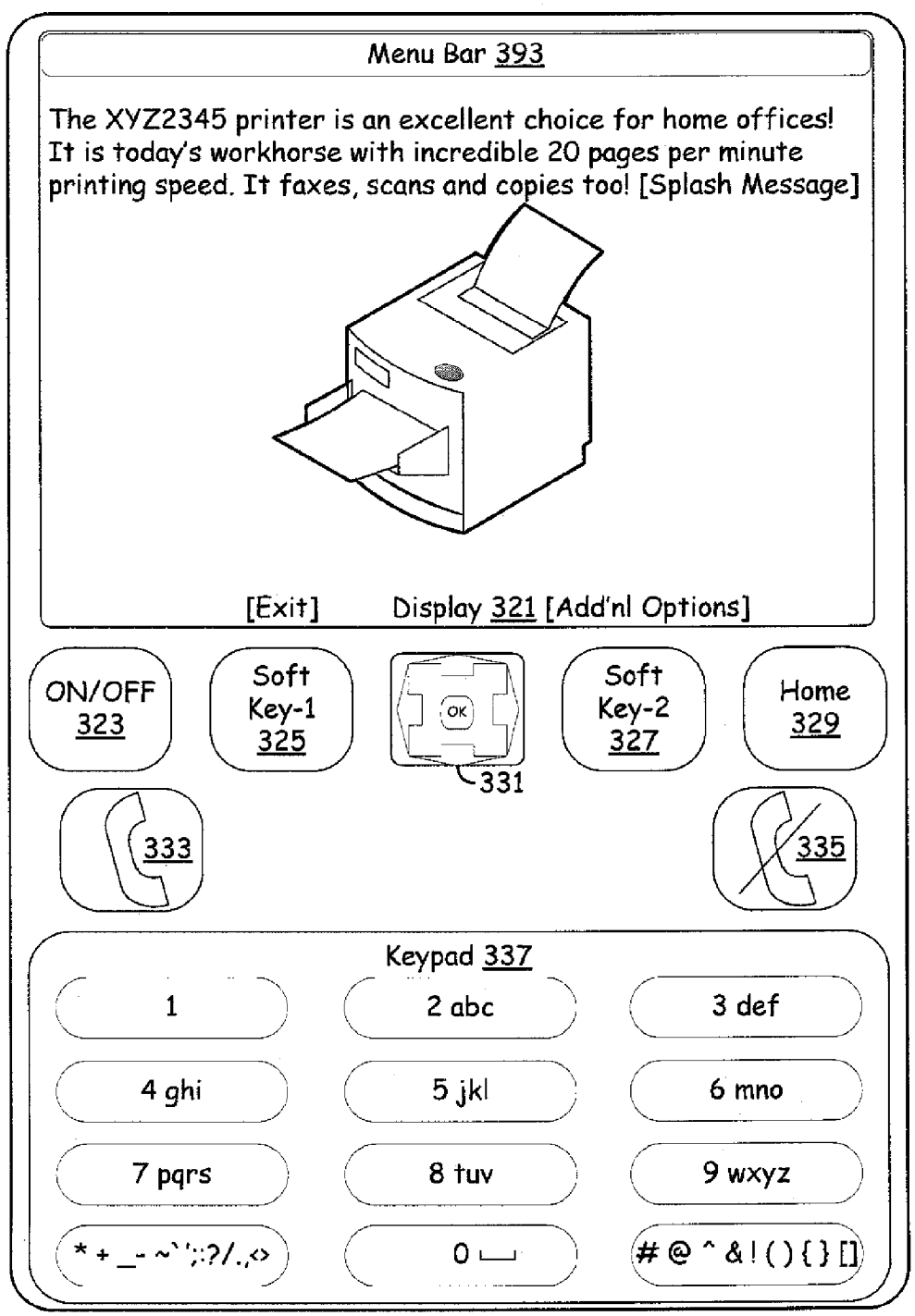
FIG. 3 is an exemplary schematic block diagram illustrating snap shot of a client mobile device displaying a splash message (audio visual display) of a product.

As a next step, when the user selects one of the categories in the welcome screen, a splash screen containing an audio visual message of a product, questionnaire preamble, real estates, cartoon preamble or audio visual guided activity preamble appears (refer to the description of FIG. 3 for more details). The splash screen is typically a first portion of an interactive media selected by the user. The splash screen (an audio visual message screen) may be ongoing such as advertisements running continuously by the distribution server 129 or user selected. The splash screen will also, in some embodiments, present a welcome message, a first portion of an interactive media, and selectable menu items and buttons. Alternatively, the splash screen may be selected on the basis of priorities set by the distribution server 129, the priorities may be set based upon user data available or price paid by the agent, seller or service provider. For example, when the user presses 'select' using a soft key after scrolling through list presented and highlighting one of them, the current interactive media is selected and displayed in next screen, where soft keys presented may be start, info and supplementary info. The user is also presented a welcome text message on screen, essentially a splash screen, with an audio welcome message presented too. Activating Info would provide audio message (called preamble).

At a next screen, a list of options is presented, depending upon the category selected, and the user is allowed to select one of these options. For example, if the user presses 'start' button, then the first item from the interactive media (a list of products, or a list of questions, etc) is presented. The soft keys are info, supplementary info, next, previous and print. Alternatively, the soft keys can be info, request, next, previous and print with request bringing up additional selection choices.

The request soft key provides an additional screen with a message and various soft key options. The additional choices that the request soft key brings are: supplementary info, appointment, sample, trial, as relevant (not all three, but those that apply) to the item under display. For example, if current item has any sample associated, it can be requested, if appointment can be made, it can be requested, and so on. The XML data for the interactive media, for each item requested, provides a slot for possible requests supported for that item, such as:

"<Request><Choice>Sample</Choice>><Choice>Trial</Choice><Choice>Appt</Choice><Choice>SuplInfo</Choice></Request>".

In addition, if a sample is requested, the user is prompted by the client mobile devices 157, 159, optionally, to provide user's shipping address. On the other hand, if trial is selected by user, a trial period is setup (or what ever the product or service happens to be) and user is prompted with a message indicating trail will begin on a particular date/time and expire on a particular date/time, and with other relevant details. If appointment is requested, then the user is provided with a list of available appointment schedule and he can select from one of them. Alternatively, user is presented a list of dates to select one from, and a list of time of the day to select one from, and the mobile client device 157 or 159 notes down user's selected of date and time and sends to distribution server 129 for processing.

The follow up behavior expected of the client mobile devices 157, 159 (while running the XML file, for example) for various request options may depend on the user selections. The selections may include appointment, trail, sample, interested, store in wish list, not in this neighborhood and not of my type. Typical behavior involves the client mobile device 157 or 159 interacting with the distribution server 129 appropriately and providing user the agent, seller or service provider side responses. Alternatively, in the above mentioned request options, all of the necessary information may be downloaded to the client mobile device 157 or 159 in one step along with the downloaded XML file and handled entirely locally.

For example, during making of an appointment, the client mobile devices 157, 159 send message to the distribution server 129 regarding the request for an appointment, the distribution server 129 in turn sends message to real estate agent (or service provider, etc.) to make an appointment, the distribution server 129 waits for agent to forward an appointment schedule and sends it to the client mobile device 157 or 159. The distribution server 129 may send appointment information (such as in standard format, iCalendar content, etc.) to the client mobile device 157 or 159 and email to client email account.

For example, the iCalendar (iCal in short, a standard—RFC 2445—for calendar data exchange) allows users to send meeting requests and tasks to other users through email. Recipients of the iCalendar email (with supported software) can respond to the sender easily or counter propose another meeting date/time. The user in the client mobile device 157 or 159 may receive iCal if appointment is sent by server, and it may send iCalendar requests to server too, if user selects one of a list of schedules to make a request for an appointment.

The distribution server 129 has several options in supporting appointment sending, appointment creation, etc. The distribution server 129 has a web server calendar component, that is, the distribution server 129 is reached using just the HTTP protocol (Hyper Text Transfer Protocol). The distribution server 129 can often be used to distribute iCalendar data about an event scheduled for the user. It can also be used and to publish busy times of an individual sales agent or sender. The distributions server 129 can embed iCalendar data in web pages provided to the user or in interactive media sent to user using hCalendar, a 1:1 microformat representation of iCalendar in semantic (X)HTML, or in other similar formats.

During purchasing of a product, the distribution server 129 sends an invoice to the user to review and approve, the user is prompted to enter a PIN code (Personal Identification Code or some security code) and select 'approve' button or soft key. After the distribution server 129 receives PIN code and approval, the distribution server 129 conducts a sales transaction with an external system and sends confirmation to the user via email, SMS, etc. That is, the distribution server 129 may follow up a purchase request via email or via message to client in mobile device 157 or 159.

If the user presses 'interested' soft key, the client mobile device 157 or 159 requests for additional information from the distribution server 129 and notes that user is interested (in the product, for example). However, if the user presses 'interested' soft key and further goes ahead and selects request and then appointment, then makes an appointment, then user's selection of an appointment is communicated to distribution server 129 and to sender of message/advertisement to user. In addition, the distribution server 129 sends interested message to agent, seller or service provider to follow up. If the user does request an appointment, the distribution server 129 sends that information to the agent, seller or service provider or to another sender as relevant. Then, the distribution server waits for the agent, seller or service provider or to another sender to forward an appointment schedule and sends it to client mobile device 157 or 159. If the user had not sent an appointment request, after pressing 'interested' soft key, then the distribution server does nothing and leaves it up to the agent, seller or service provider or to another sender to follow up.

If the user presses 'trial' soft key, the client mobile device 157 or 159 requests the agent, seller or service provider, via distribution server 129, to make the product available for a trail. The user is requested to provide all of the necessary details such as address or email ID (IDentification). Then, the client mobile device 157 or 159 sends these details to the distribution server and then from there to the agent, seller or service provider. Then, the client mobile device 157 or 159 provides details of the product or service and how it can be accessed for a trial. The client mobile device 157 or 159 also provides details of trial period and enrollment for an exercise club or trial membership in any club or magazine, for example.

If the user presses 'store in wish list' soft key, the client mobile device 157 or 159 stores in wish list for the user in server side or alternatively in the client mobile device 157 or 159. The user is able to retrieve the wish list and browse at any time. The user may also receive support for a website based wish list browsing and purchasing by user supported by server.

If the user presses 'not in this neighborhood' soft key, the client mobile device 157 or 159 indicates to the agent, seller, service provider or sender that user is not listed in such a neighborhood. For real estate, this indicates that user does not mind the features and style of the property but it happens to be in a neighborhood that the user does not like for some reason. If the user presses 'not of my type' soft key, the client mobile device 157 or 159 indicates to the agent, seller, service provider or sender that user does not like the individual content, and that it does not suit user's taste or requirements. For real estate, this indicates that the user does not mind the neighborhood but the style of the house, its location or its features are not what the user expected or desires.

In addition to all the above mentioned services provided, the client mobile devices 157 or 159 also provide options for the user to leave audio feedback by recording into mobile phone, for any item in the list presented. The client mobile device 157 or 159 then sends the recorded audio feedback, via the distribution server 129, to the agent, seller, service provider or sender for review.

The soft keys provide various options for the user such as to exit, quit, go back or go forward. For example, at end of list of interactive media, the user is presented a list of things selected by user. The user can press 'done', 'exit' or 'forward' (to someone such as by selecting a phone number from contact list to one or more people) soft keys. If 'done' is selected, screen goes back to main splash screen wherein the list of available interactive media is presented, with updated list entries. If 'exit' is selected, the application quits. If 'forward' is selected, either the selected items or entire interactive media is sent to one or more people.

For example, if the user presses 'forward' soft key, the client mobile device 157 or 159 forwards selections to one or more people by requesting for addresses from the user or forwards the entire original interactive media (such as questionnaire or product list) to one or more people.

To perform the above mentioned functionalities, the distribution server 129 has many modules such as interactive media gathering module 131, interactive media assembly module 133, interactive media delivery module 135 and interactive media follow-up module 137.

In one embodiment, the mobile device prompts a user to review a product comprised in an interactive media. In addition, a "purchase" option is provided in the multiple choice displayed. If a user selects the purchase option, the user is subsequently prompted to approve of the sale, and details of the sales event are captured by the mobile device. It is then delivered to the distribution server, which selectively forwards it to an external system, such as a billing system or a service provider system.

In one embodiment, the mobile device supports dynamic screen display employing a plurality of soft keys for user interaction. The mobile device receives an interactive media delivered from the distribution server to which it is communicatively coupled. The mobile device presents the interactive media in a series of dynamically generated screens to a mobile user. For example, the interactive media comprises data and configuration used by the mobile device to present portions of the interactive media in appropriate screens. The mobile device interactively sends user responses received from the screens, such as selections to multiple choice sets presented, to the distribution server. In a related embodiment, the mobile device presents a welcome screen for the interactive media. The welcome screen comprises at least one of an audio message, a graphic image and a welcome text. The welcome screen enables a user to select the interactive media from a plurality of interactive media currently available at the distribution server. In a different related embodiment, the mobile device presents a welcome screen wherein the welcome screen provides one or more options for selection by a user. For example, the options can comprise of the following set of options:

advertisements;
questionnaires;
product lists for review;
real estate content;
cartoons; and
audio guided activities.

A user can select from one of these options, and a list of currently available interactive media associated with that user selection is displayed.

FIG. 2 is an exemplary schematic block diagram illustrating snap shot of a client mobile device 205 displaying a welcome screen. In the present embodiment of the invention shown in illustration, only two soft keys 225, 227 are considered, however many client mobile devices may have more than two soft keys which may be utilized in designing interactive media. A typical client mobile device 205 has a keyboard 237 containing alpha-numeric keypad, an 'ON/OFF' button 223, scrolling keys (up, down, right and left) 231, 'home' button 229, 'call' button 233, 'end call' button 235, soft keys 225, 227 and a display 221. The display contains a menu bar 293 and a display area that in the current illustration shows welcome screen.

Typically, the welcome screen may contain a splash message (audio visual message) letting the user know about the services provided by the interactive media and providing multiple choice selections. These selections allow user to pick one of many categories of interactive media. The welcome screen shown has a title 'WELCOME—The following Interactive Media are available at this time:'. In addition, the welcome screen has a '[♪]'selectable symbol, which upon selecting provides an audio introductory message regarding the services provided and multi choice options available. Similarly, a video button may be incorporated that upon selection provides a splash video message. In addition the multi choice options contain categories product lists for review, questionnaires, local advertisements, property on sale, cartoons and audio guided activities. The user may select a choice such as local advertisements (as illustrated) by scrolling using buttons 231 and selecting by using soft key-1 225 and press soft key-2 227 to start the local advertisements.

FIG. 3 is an exemplary schematic block diagram illustrating snap shot of a client mobile device 305 displaying a splash message (audio visual display) of a product. In the illustration, only two soft keys 325, 327 are considered. The client mobile device 305 illustrated has a keyboard 337 containing alpha-numeric keypad, an 'ON/OFF' button 323, scrolling keys (up, down, right and left) 331, 'home' button 329, 'call' button 333, 'end call' button 335, soft keys 325, 327 and a display 321. The display contains a menu bar 393 and a display area that in the current illustration shows splash screen.

The current illustration shows a splash message being displayed, in the display 321, in response to the user selecting local advertisements and pressing 'start' button (refer to the description of FIG. 2) in the welcome screen. The advertisement shown has a preamble 'The XYZ2345 printer is an excellent choice for home offices! It is today's workhorse with incredible 20 pages per minute printing speed. If faxes, scans and copies too!'. A graphical image of the XYZ2345 printer is also presented. The message is followed by '[Splash Message]' option which upon selection shows an audio visual clip regarding the XYZ2345 printer. The soft keys 325, 327 are assigned with functionalities of 'Exit' and 'Additional Options' respectively. In other embodiments, the functionalities may be designed differently depending on the number of soft keys available.

Figure 4:
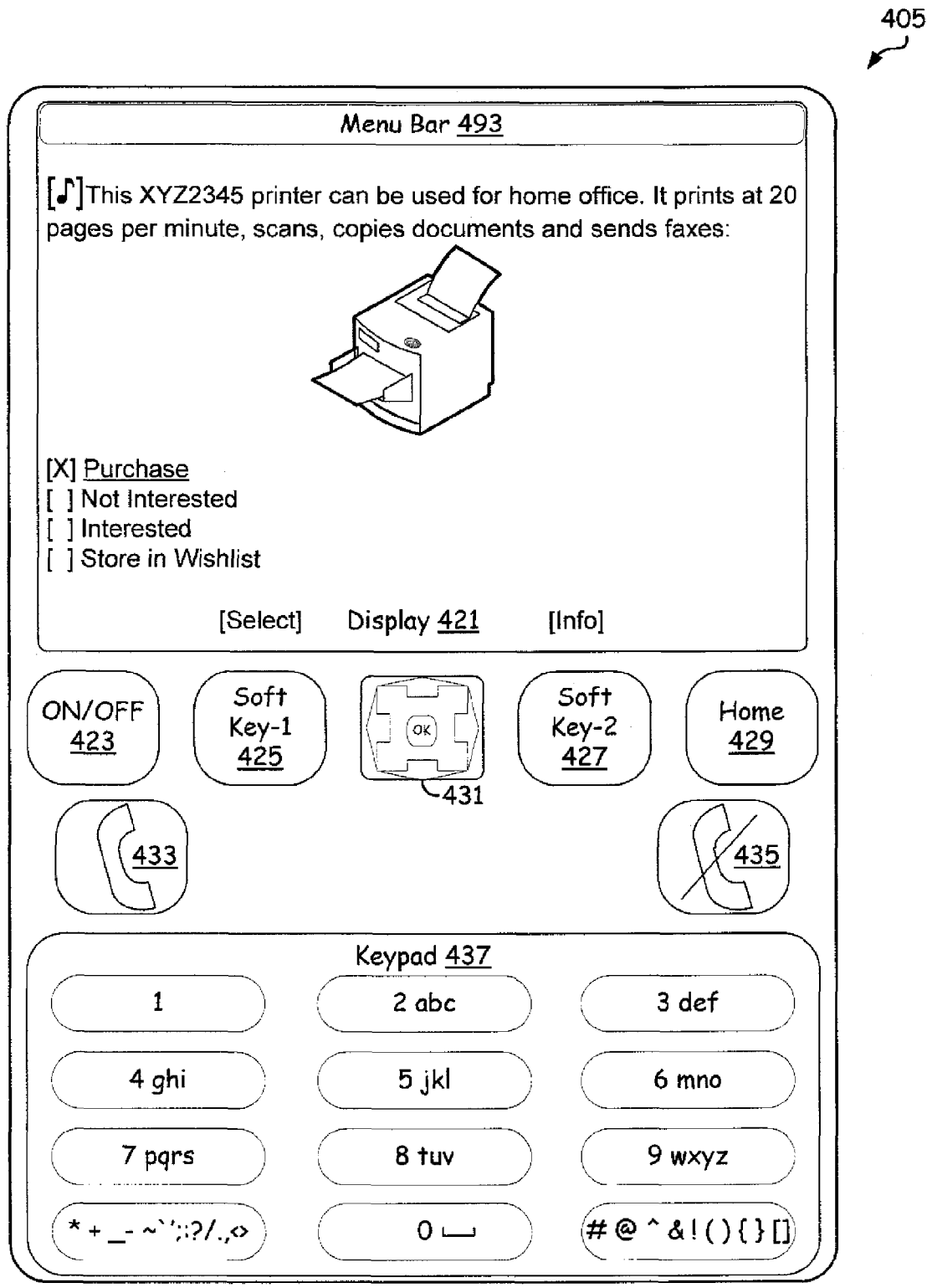
FIG. 4 is an exemplary schematic block diagram illustrating snap shot of a client mobile device displaying additional options after a splash (audio visual display) message.

FIG. 4 is an exemplary schematic block diagram illustrating snap shot of a client mobile device 405 displaying additional options after a splash (audio visual display) message. In this illustration, only two soft keys 425, 427 are considered. The client mobile device 405 illustrated has a keyboard 437 containing alpha-numeric keypad, an 'ON/OFF' button 423, scrolling keys (up, down, right and left) 431, 'home' button 429, 'call' button 433, 'end call' button 435, soft keys 425, 427 and a display 421. The display contains a menu bar 493 and a display area that in the current illustration shows additional options screen.

The additional options screen may contain a message such as 'This XYZ2345 printer can be used for home office. It prints at 20 pages per minute, scans, copies documents and sends faxes:' letting the user know about the product and provides multiple choice selections. These selections allow user to pick one of many multi choice options. A graphical image of the XYZ2345 printer is also presented. In addition, the additional options screen has a '[♪]'selectable symbol, which upon selecting provides an audio message regarding the product and multi choice options available. Similarly, a video button may be incorporated that upon selection provides a audio visual message.

The multi choice options contain options purchase, not interested, interested and store in wish list. The user may select a choice such as purchase (as illustrated) by scrolling using buttons 431 and selecting by using soft key-1 425 to start the purchase procedures. The user may get additional information regarding the XYZ2345 printer by pressing soft key-2 427 having option as 'Info'.

Figure 5:
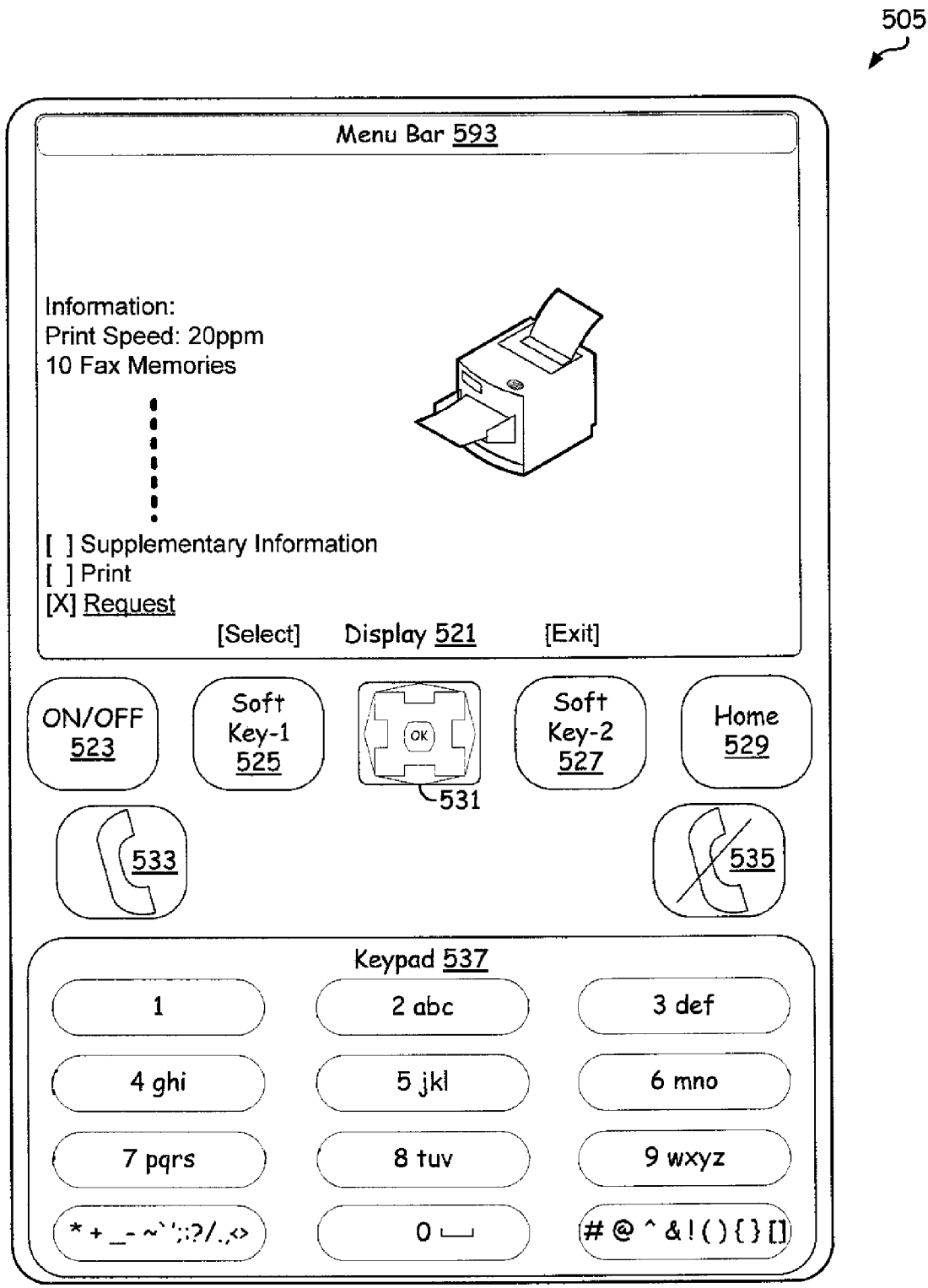
FIG. 5 is an exemplary schematic block diagram illustrating snap shot of a client mobile device displaying additional information of a product.

FIG. 5 is an exemplary schematic block diagram illustrating snap shot of a client mobile device 505 displaying additional information of a product. In this illustration, only two soft keys 525, 527 are considered. The client mobile device 505 illustrated has a keyboard 537 containing alpha-numeric keypad, an 'ON/OFF' button 523, scrolling keys (up, down, right and left) 531, 'home' button 529, 'call' button 533, 'end call' button 535, soft keys 525, 527 and a display 521. The display contains a menu bar 593 and a display area that in the current illustration shows information screen.

The information screen provides information regarding the product, here it is about XYZ2345 printer. A graphical image of the XYZ2345 printer is also presented. Additional multi choice options provided include supplementary information, print and request. These selections allow user to pick one of many multi choice options. The information screen may also be provided with '[♪]'selectable symbol, which upon selecting provides an audio message regarding the product and multi choice options available. Similarly, a video button may be incorporated that upon selection provides a audio visual information message.

The multi choice options contain options supplementary information, print and request. The user may select a choice such as request (as illustrated) by scrolling using buttons 531 and selecting by using soft key-1 525 to start the request procedures. The user may exit the current advertisement by pressing soft key-2 527 having option as 'Exit'.

Figure 6:
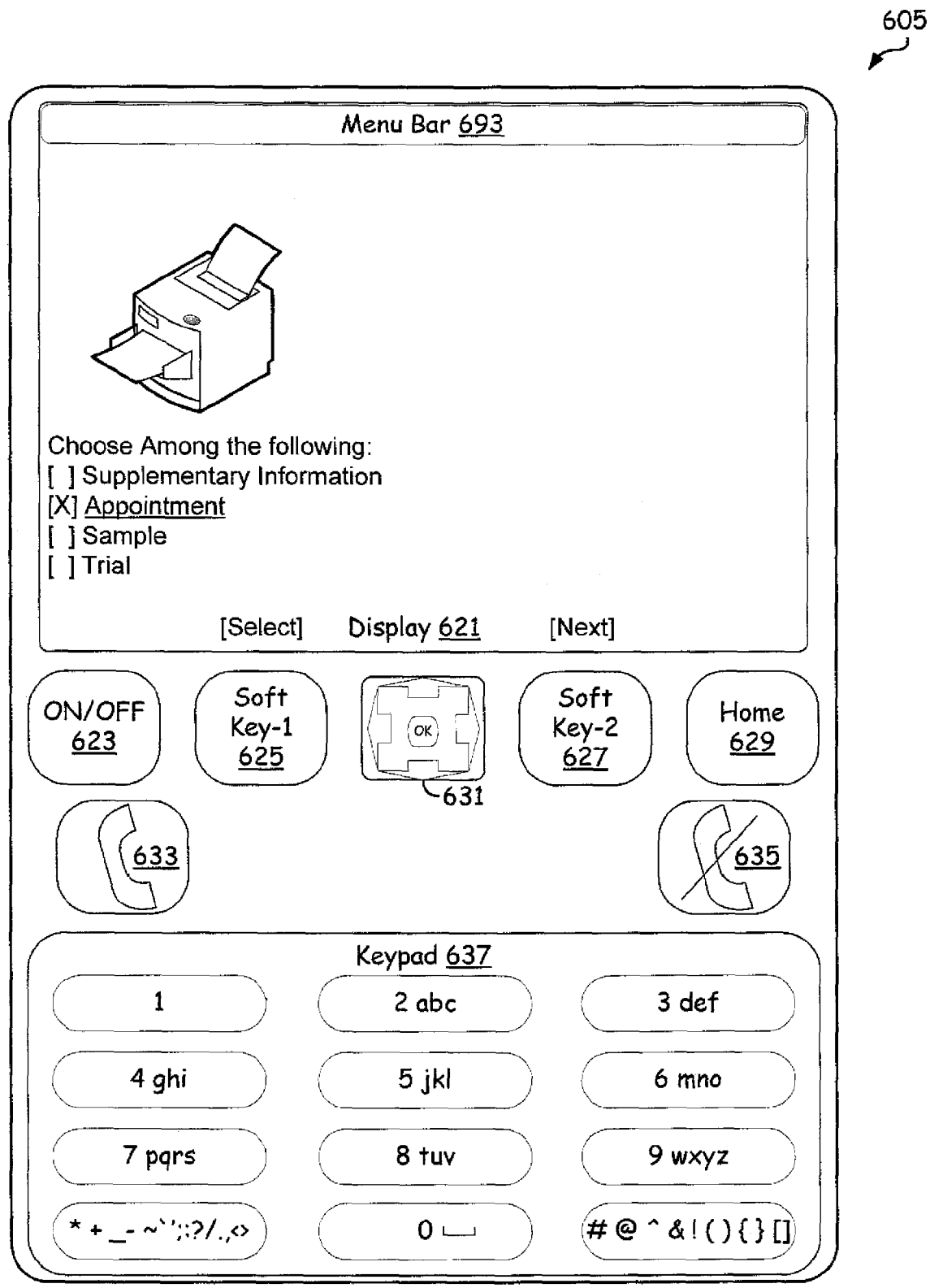
FIG. 6 is an exemplary schematic block diagram illustrating snap shot of a client mobile device displaying additional options containing choices of appointment, sample and/or trial.

FIG. 6 is an exemplary schematic block diagram illustrating snap shot of a client mobile device 605 displaying additional options containing choices of appointment, sample and/or trial. In this illustration, only two soft keys 625, 627 are considered. The client mobile device 605 illustrated has a keyboard 637 containing alpha-numeric keypad, an 'ON/OFF' button 623, scrolling keys (up, down, right and left) 631, 'home' button 629, 'call' button 633, 'end call' button 635, soft keys 625, 627 and a display 621. The display contains a menu bar 693 and a display area that in the current illustration shows request screen.

The request screen provides options to contact agent, seller, service provider or sender such as supplementary information, appointment, trial or sample (depending on the product in consideration). A graphical image of the XYZ2345 printer may also be presented. The multi choice options provided here include supplementary information, appointment, trial or sample (sample may not be appropriate regarding the XYZ2345 printer, in this case though). These selections allow user to pick one of many multi choice options and make a request. The information screen may also be provided with '[♪]'selectable symbol, which upon selecting provides an audio message regarding the product and multi choice options available. Similarly, a video button may be incorporated that upon selection provides a audio visual information message. The user may select a choice such as appointment (as illustrated) by scrolling using buttons 631 and selecting by using soft key-1 625 to make an appointment. The user may go to the next screen by pressing soft key-2 627 having option as 'Next'.

For example, if the XYZ2345 has any sample associated, it can be requested, if appointment can be made, it can be requested, and trial run can also be requested. In addition, if a sample is requested, the user is prompted to provide user's shipping address. If trial is selected by user, a trial period is setup and user is prompted with a message indicating trail will begin on a particular date/time and expire on a particular date/time, and with other relevant details. If appointment is requested (as illustrated), then the user is provided with a list of available appointment schedule and he can select from one of them (refer to the description of FIG. 7). Alternatively, user is presented a list of dates to select one from, and a list of time of the day to select one from, and the client notes down user's selected of date and time and sends to server for processing.

Figure 7:
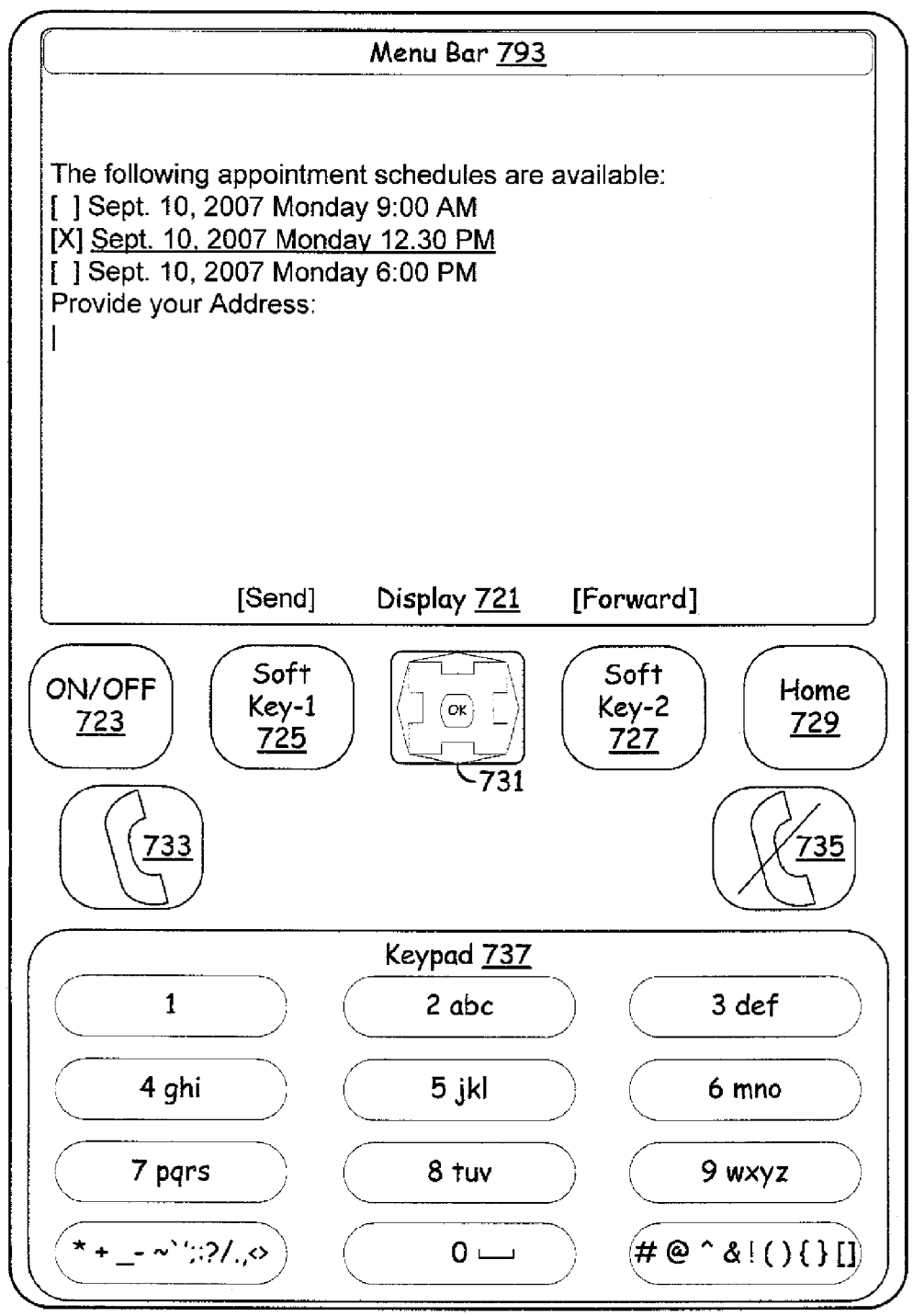
FIG. 7 is an exemplary schematic block diagram illustrating snap shot of a client mobile device displaying appointment schedules.

FIG. 7 is an exemplary schematic block diagram illustrating snap shot of a client mobile device 705 displaying appointment schedules. In this illustration, only two soft keys 725, 727 are considered. The client mobile device 705 illustrated has a keyboard 737 containing alpha-numeric keypad, an 'ON/OFF' button 723, scrolling keys (up, down, right and left) 731, 'home' button 729, 'call' button 733, 'end call' button 735, soft keys 725, 727 and a display 721. The display contains a menu bar 793 and a display area that in the current illustration shows appointment screen. Trail and sample screens (not shown) may also have similar designs.

The appointment screen provides options to contact agent, seller, service provider or sender. The multi choice options provided here include different possible date and times to fix an appointment. The illustration shows a preamble 'The following appointment schedules are available:' and dates and times such as 'Sep. 10, 2007 Monday 9:00 AM' or 'Sep. 10, 2007 Monday 12:30 PM'. These selections allow user to pick one of many multi choice options and make an appointment. The information screen may also be provided with '[♪]'selectable symbol, which upon selecting provides an audio message regarding the appointment options available. The user may select a choice such as 'Sep. 10, 2007 Monday 12:30 PM' (as illustrated) by scrolling using buttons 731 and sending this information by using soft key-1 725. The user may forward the entire interactive media to another person by pressing soft key-2 727 having option as 'Forward'.

Figure 8:
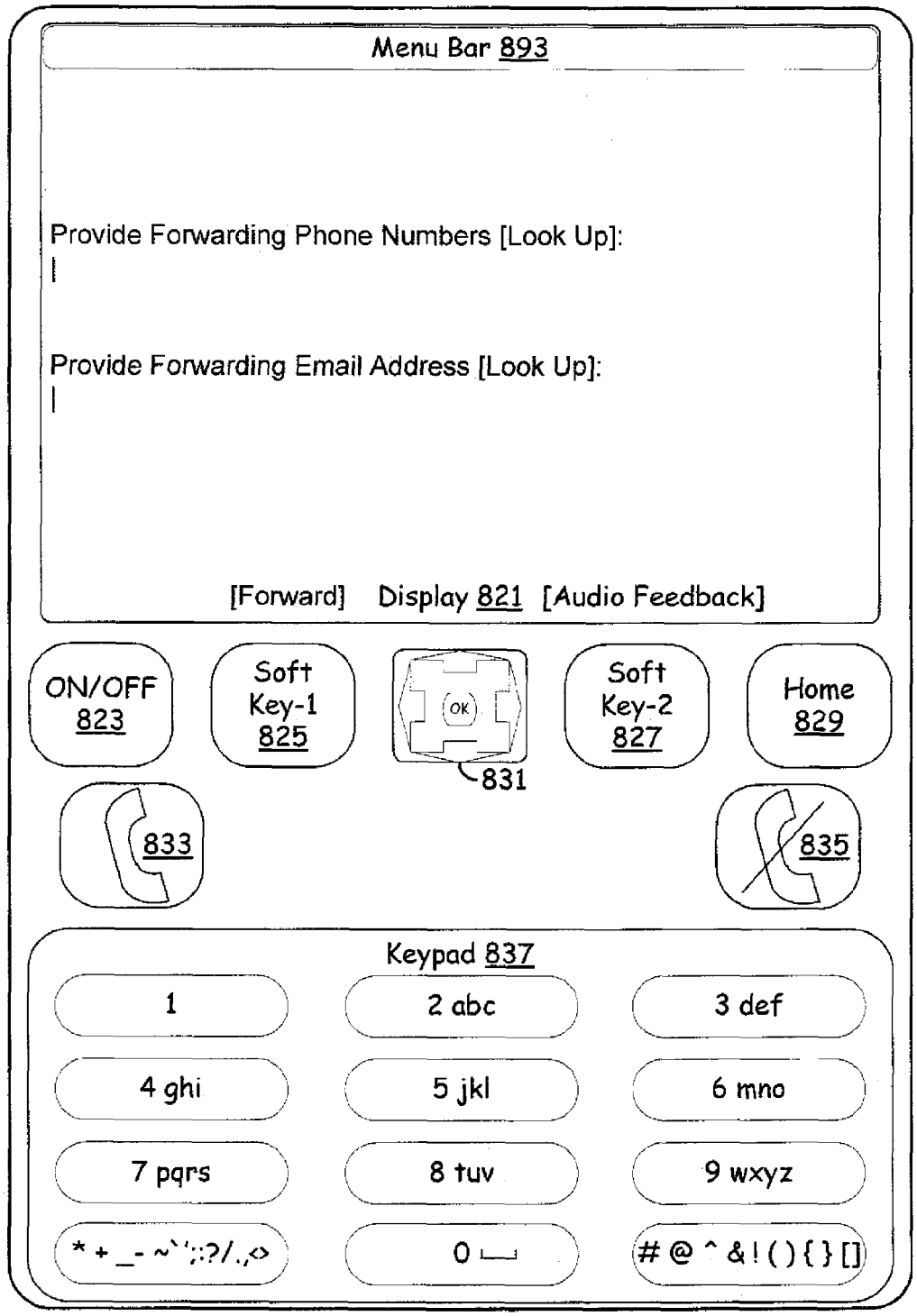
FIG. 8 is an exemplary schematic block diagram illustrating snap shot of a client mobile device requesting for forwarding phone numbers and email addresses.

FIG. 8 is an exemplary schematic block diagram illustrating snap shot of a client mobile device 805 requesting for forwarding phone numbers and email addresses. In this illustration, only two soft keys 825, 827 are considered. The client mobile device 805 illustrated has a keyboard 837 containing alpha-numeric keypad, an 'ON/OFF' button 823, scrolling keys (up, down, right and left) 831, 'home' button 829, 'call' button 833, 'end call' button 835, soft keys 825, 827 and a display 821. The display contains a menu bar 893 and a display area that in the current illustration shows forward screen.

The forward screen allows user to forward the entire interactive media to one or more recipients. The provisions provided here allows the user to enter phone numbers or email addresses. The illustration shows a preamble 'Provide Forwarding Phone Numbers:' and '[Look Up]' option. Selecting the '[Look Up]' option allows the user to scroll through the contact list and select one or more phone numbers. The illustration also shows a preamble 'Provide Forwarding Email Address:' and '[Look Up]' option. Here, selecting the '[Look Up]' option allows the user to scroll through the contact list and select one or more email addresses. The preambles are followed by spaces to enter the necessary information. The user may enter the necessary phone numbers and email addresses and press 'forward' button by using soft key-1 825. The user may also leave audio feedback by pressing soft key-2 827 having option as 'Audio Feedback'.

Figure 9:
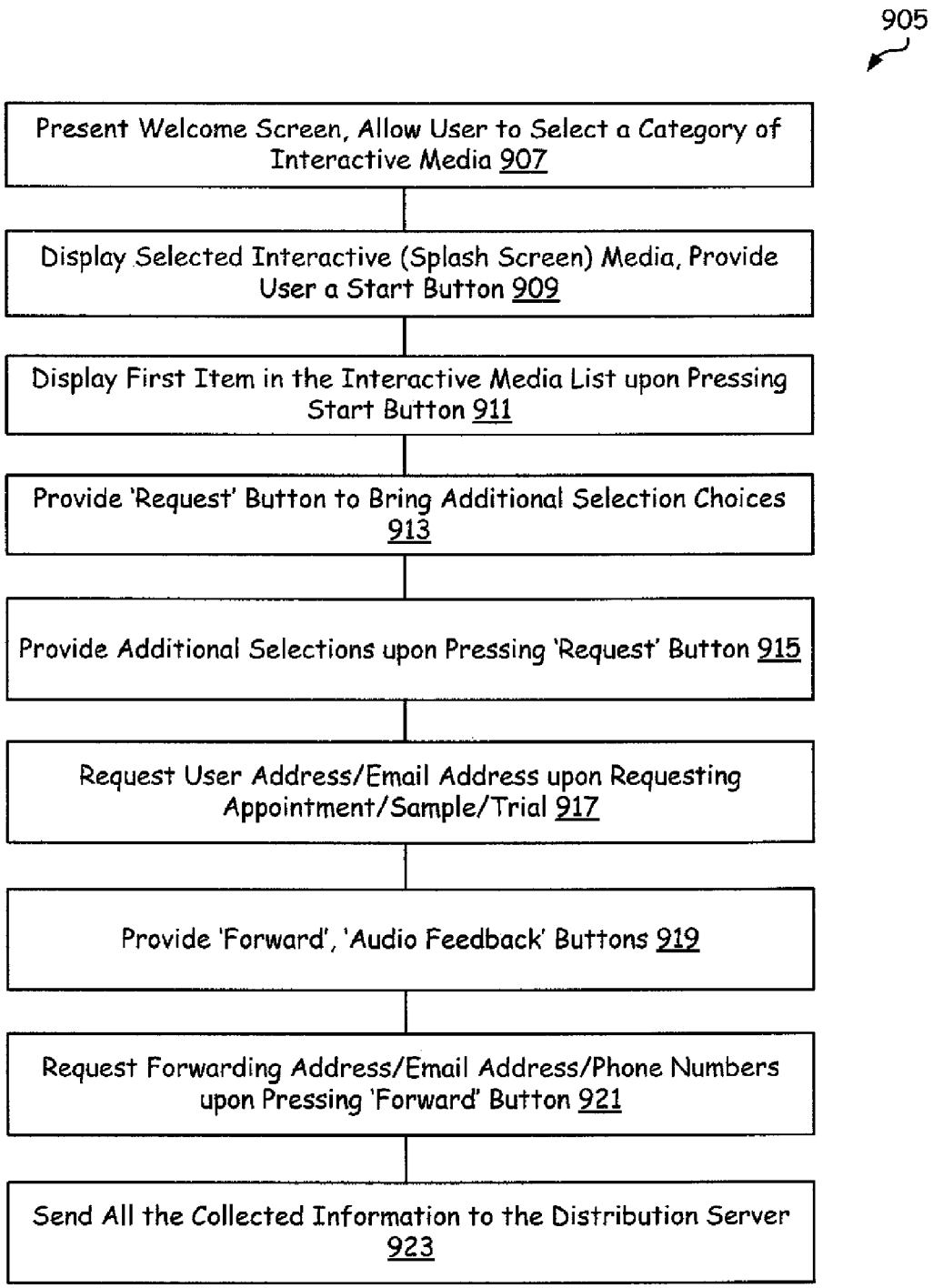
FIG. 9 is a flow diagram illustrating functionality of the client mobile device of FIG. 1, during running of interactive media.

FIG. 9 is a flow diagram illustrating functionality of the client mobile device of FIG. 1, during running of interactive media. The functionality of the client mobile device during running of interactive media begins at a block 907 when the client mobile device presents a welcome screen, allowing user to select a category of interactive media. The categories of interactive media may include product lists for review, questionnaires, local advertisements, property on sale, cartoons and audio guided activities. The user may select a choice by using scroll buttons and by pressing one of the soft keys. At a next block 909, the client mobile device displays splash screen of the selected interactive media by providing user with start button. At a next block 911, the client mobile device displays first item in the interactive media list upon pressing start button.

The displayed interactive media may be one of ongoing interactive media running continuously by a distribution server or be one of user selected. Alternatively, the displayed interactive media may be selected on the basis of priorities set by the distribution server, the priorities may be set based upon user data available or price paid by the agent, seller or service provider. The displayed interactive media may contain a audio visual message with a preamble. A graphical image may also presented at the end of the audio visual message. Alternatively, individual buttons (soft keys, for example) may allow user to choose: (i) the displayed message; (ii) displayed message with an audio clip; or (iii) an audio visual presentation with the message being displayed at the end.

At a next block 913, the client mobile device provides a 'request' button to provide additional choices. At a next block 915, the client mobile device provides additional selections upon pressing the soft key 'request'. The additional selections include appointment, trial and sample options. If the current item has any sample associated with it, it can be requested, if appointment can be made, it can be requested, and trial run can also be requested. At a next block 917, the client mobile device requests user for a address/email address upon requesting for appointment or sample or trial. For example, if a sample is requested, the user is prompted to provide user's shipping address. If trial is selected by user, a trial period is setup and user is prompted with a message indicating trail will begin on a particular date/time and expire on a particular date/time, and with other relevant details. If appointment is requested, then the user is provided with a list of available appointment schedule and the user can select from one of them. Alternatively, user is presented a list of dates to select one from, and a list of time of the day to select one from, and the client mobile device notes down user's selected of date and time and sends to the distribution server for processing. Other supports of communication for requests may also be provided such as email support or web site support.

At a next block 919, the client mobile device provides 'forward' and 'audio feedback' buttons. At a next block 921, the client mobile device requests for forwarding phone numbers, email addresses or postal addresses upon pressing 'forward' button. The 'forward' and 'audio feedback' buttons allow user to forward interactive media to a recipient or leave feedback massage to the agent, seller or service provider. The 'forward' button allows the user to forward the entire interactive media to a recipient by providing phone numbers or email addresses. The user may also leave audio feedback by pressing a soft key having option 'audio feedback' and recording a message and sending it. At a final block 923, the client mobile device sends all of the collected information to the distribution server.

Figure 10:
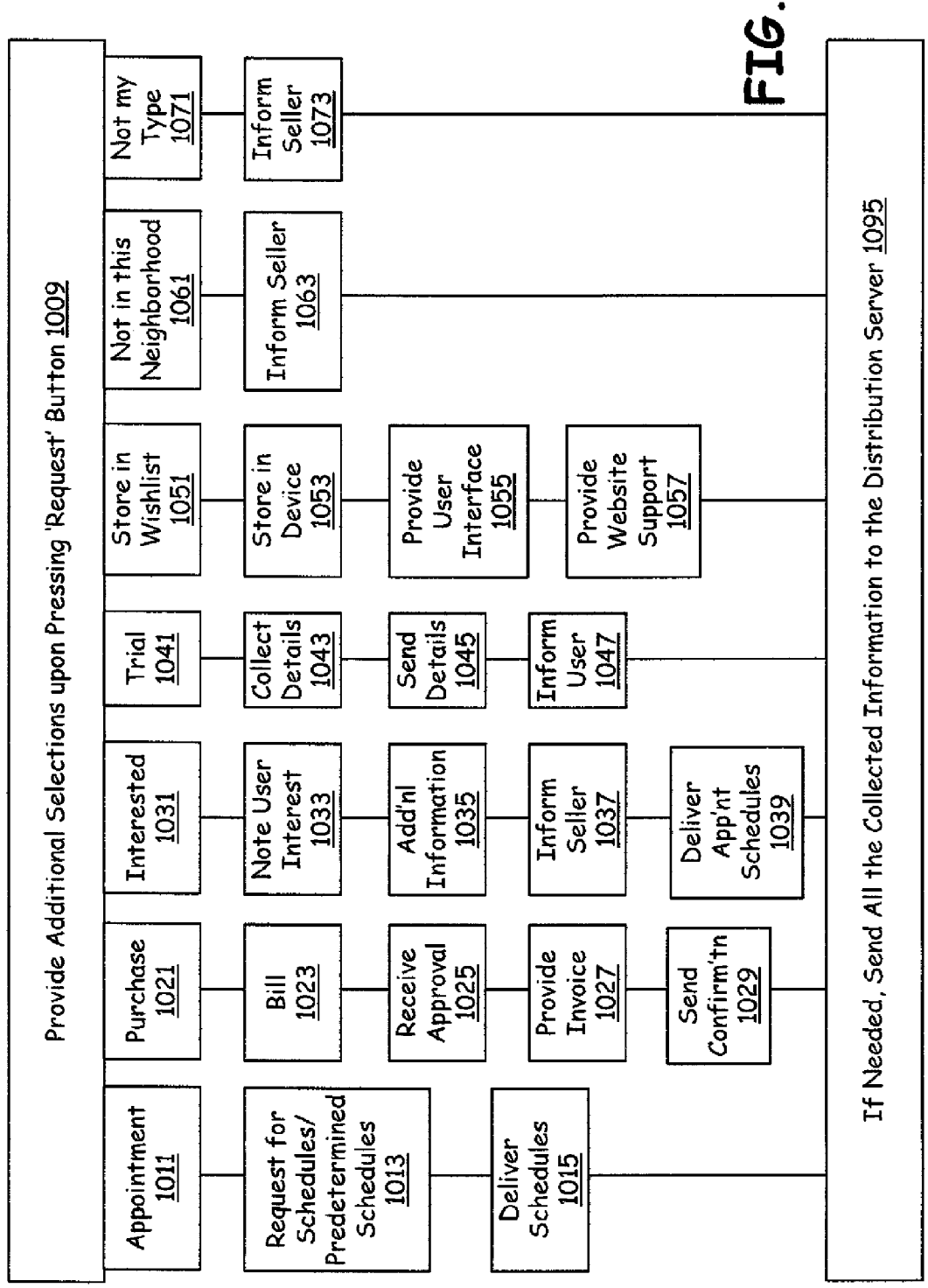
FIG. 10 is a flow diagram illustrating functionality of the client mobile device of FIG. 1, in detail.

FIG. 10 is a flow diagram illustrating functionality of the client mobile device of FIG. 1, in detail. The detailed functionality begins when the client mobile device provides additional selections upon pressing 'request' button at a block 1009. The user may choose one of appointment, purchase, interested, trail (or sample), store in wish list, not in this neighborhood or not my type options.

At a block 1011, the user chooses the option of 'appointment'. In response, the client mobile device requests distribution server for schedules or retrieves predetermined schedules, at a next block 1013. At a next block 1015, the client mobile device delivers schedules. At a next block 1095, the client mobile device collects all the user responses in return to the delivered schedules and sends them to the distribution server.

At a block 1021, the user chooses the option of 'purchase'. In response, the client mobile device bills the user. At a next block 1025, the client mobile device receives user approval to the bill. At a next block 1027, the client mobile device requests the server for an invoice for user approval, receives it and displays it on the screen. The user is prompted to enter a PIN code (Personal Identification Code or some security code) and select 'approve' button or soft key. After the distribution server receives PIN code and approval, the distribution server conducts a sales transaction with an external system and sends confirmation to the user (either directly to the client mobile device or via email, SMS, etc.), at a next block 1029.

At a next block 1095, the client mobile device collects all the user responses and sends them to the distribution server.

At a block 1031, the user chooses the option of 'interested'. In response, the client mobile device notes user interest, at a next block 1033. At a next block 1035, the client mobile device requests the distribution server for additional information and displays it on the screen. The additional information may be a splash message or simply a display message with an audio clip. At a next block 1037, the client mobile device sends this information to the agent, seller, service provider or a client as the case may be. At a next block 1039, the client mobile device displays appointment schedules to the user allowing user to make an appointment to get further information. At a next block 1095, the client mobile device collects all the user responses and sends them to the distribution server.

At a block 1041, the user chooses the option of 'trial'. The client mobile device responds, at a next block 1043, the user is requested to provide all of the necessary details such as address or email ID (IDentification). Then, at a next block 1045, the client mobile device sends these details to the distribution server and then from there to the agent, seller or service provider. The client mobile device requests the agent, seller or service provider, via distribution server, to make the product available for a trail. Then, at a next block 1047, the client mobile device informs the user regarding details of the product or service and how it can be accessed for a trial. The client mobile device also provides details of trial period and enrollment for an exercise club or trial membership in any club or magazine, for example. At a next block 1095, the client mobile device sends collected user responses to the distribution server.

At a block 1051, the user chooses the option of 'store in wish list'. The client mobile device responds, at a next block 1053, by storing the product or service in wish list in server side or alternatively in the client mobile device itself. At a next block 1055, the client mobile device provides user interface to retrieve the wish list and browse at any time. At a next block 1057, the client mobile device provides support for a website based wish list browsing and purchasing by user supported by server. At a next block 1095, the client mobile device sends collected user responses to the distribution server.

At a block 1061, the user chooses the option of 'not in this neighborhood'. At a next block 1063, the client mobile device informs the agent, seller, service provider or sender that user is not listed in such a neighborhood. For real estate, this indicates that user does not mind the features and style of the property but it happens to be in a neighborhood that the user does not like for some reason. At a next block 1095, the client mobile device sends collected user responses to the distribution server.

At a block 1071, the user chooses the option of 'not my type'. At a next block 1073, the client mobile device informs the agent, seller, service provider or sender that user does not like the individual content, and that it does not suit user's taste or requirements. For real estate, this indicates that the user does not mind the neighborhood but the style of the house, its location or its features are not what the user expected or desires. At a next block 1095, the client mobile device sends collected user responses to the distribution server.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A client component for a mobile device for operating in a network, the client component comprising:
   the client component supporting dynamic screen display and employing a plurality of soft keys for user interaction;
   the client component receiving interactive media delivered from a distribution server to which the client component is communicatively coupled, wherein the interactive media comprises an offer for a trial of a product;
   the client component presenting the interactive media to a mobile user and soliciting one or more user responses, wherein each of a series of dynamically generated screens comprises a request soft key that provides request options for selection by the user;
   the client component prompting the mobile user to opt for the trial of the product;
   the client component setting up a trial period when the mobile user selects the trial;
   the client component alerting the mobile user with a message indicating that the trial will begin on a first date and expire on a second date associated with the trial period; and
   the client component sending the one or more user responses to the distribution server.

2. The client component of claim 1, further comprising:
   the client component downloading the interactive media in an XML (eXtensible Markup Language) format and processing the interactive media after download, presenting the interactive media to the mobile user of the mobile device, collecting the user responses, processing the user responses provided and sending them back to the distribution server for followup.

3. The client component of claim 1, wherein the interactive media comprises a welcome screen that provides options for selection by a user, the options comprising at least one of:
   advertisements;
   questionnaires;
   product lists for review;
   real estate content;
   cartoons; and
   audio guided activities.

4. The mobile device of claim 1, wherein the interactive media comprises an offer to setup an appointment with a service provider for a meeting, the client component further comprising:
   the client component prompting the mobile user to request an appointment;
   the client component presenting the mobile user with a list of available appointment schedule and soliciting a selection by the mobile user; and
   the client component accepting the selection by the mobile user from the list of available appointment schedule and communicating it to the distribution server.

5. The client component of claim 1, wherein the interactive media is presented to the mobile user in a series of display screens, each of the series of display screens comprising a request soft key, wherein the request soft key provides options for selecting at least one of:
   a supplementary information;
   an appointment request;
   a product or service sample request;
   a trial request; and
   a forward interactive media request.

6. The client component of claim 5, wherein the client component receives a user selection via the request soft key options and communicates it to the distribution server for followup action by the distribution server.

7. The client component of claim 5, wherein the client component receives a user selection via the request soft key options and handles a followup action entirely locally, wherein the followup action is one or more activities, as appropriate to address the mobile user's selection, from the set of actions comprising retrieval and presenting of additional interactive media, forwarding of interactive media, making an appointment, purchasing a product, retrieval of supplementary information and requesting a trial of a product or service.

8. The client component of claim 1, further comprising:
the interactive media comprising a prompt to the mobile user related to purchase of a product or service;
the client component receiving a user response indicating interest in purchasing the product or service and communicating it to the distribution server;
the client component receiving and presenting an invoice sent by the distribution server for the mobile user to review and approve;
the client component prompting the mobile user to enter a PIN code and to select a button or soft key in order to indicate approval;
the client component receiving the PIN code and approval from the user and communicating it to the distribution server to conduct a sales transaction with an external system; and
the client component receiving confirmation of a completion of purchase and displaying it to the mobile user.

9. The client component of claim 1, wherein the message comprises a first time for the first date and a second time for the second date.

10. A client component for a mobile device, the client component capable of interacting with a server, the client component comprising;
the client component displaying a list of categories of interactive media with a search facility for user selection, wherein the categories include one or more from a set comprising product lists for review, questionnaires, local advertisements, property for sale, cartoons, guided activities, interactive songs and interactive movies, wherein the interactive media comprises at least one of video segments and audio segments;
the client component soliciting a user category selection from the list of categories of interactive media and presenting a list of interactive media based on the user category selection;
the client component retrieving a user selected interactive media when the user selects one of the items from the list of interactive media;
the client component presenting the user selected interactive media that comprises the at least one of video segments and audio segments to a user and collecting a user response that the user provides while viewing the user selected interactive media; and
the client component selectively communicating the user response to the server for followup actions.

11. The client component of claim 10, wherein the user selected interactive media comprises multiple items, wherein each of the multiple items comprises a text, graphics, audio segments, and or video clips.

12. The client component of claim 10, wherein the user selected interactive media is forwarded by the client component to one or more recipients identified by the user.

13. The client component of claim 10, wherein the client component facilitates specifying an interest level by a user for at least one item of the multiple items from the user selected interactive media presented to the user.

14. The client component of claim 10, further comprising:
the client component receiving an audio feedback from the user and communicating the audio feedback to the server.

15. A method performed by a client component in a client device that supports presentation of interactive media, the method comprising:
presenting a welcome screen;
providing an interactive media selection menu;
displaying user selected interactive media, wherein displaying comprises processing a metadata or a configuration retrieved along with the interactive media, and wherein the metadata or configuration indicates to the client component the need to play an advertisement;
showing additional selection menu items for user selection;
collecting a user response;
sending the collected user response to a server; and
wherein the selected interactive media is displayed in a series of screens, and wherein each of the series of screens comprises a request soft key that provides request options for selection by the user.

16. The method of claim 15, wherein the additional selection menu items comprise one or more request options from a set of actions comprising requesting an appointment schedule, requesting a sample of at least one product or service, requesting a trial of a service or software and indicating user interest.

17. The method of claim 16, wherein during fulfillment of the request options the client component interacts with the server to deliver screens appropriately.

18. The method of claim 15, wherein the additional selection menu comprises a forward option that allows the user to forward the interactive media to one or more recipients.

19. The method of claim 15, wherein collecting comprises:
accepting input provided by the user by way of selecting from multiple choices and options provided in the screens by the client component, such user input from the screens collected for communication to the server.

20. The method of claim 15, wherein sending comprises:
communicating the user responses collected, by the client component, to the distribution server to retrieve additional interactive media or to conduct followup actions.

21. The method of claim 15, wherein the metadata or configuration indicates to the client component the need to play an advertisement before, during or after the display of the interactive media; and displaying comprises manifesting the interactive media on the mobile device incorporating the metadata or configuration.

* * * * *